(12) United States Patent
Gerhold

(10) Patent No.: US 6,928,821 B2
(45) Date of Patent: Aug. 16, 2005

(54) DUAL FUEL POWER GENERATION SYSTEM

(75) Inventor: Bruce W. Gerhold, Bartlesville, OK (US)

(73) Assignee: Conocophililps Company, Houston, TX (US)

(*) Notice: Subject to any disclaimer, the term of this patent is extended or adjusted under 35 U.S.C. 154(b) by 19 days.

(21) Appl. No.: 10/814,008

(22) Filed: Mar. 31, 2004

(65) Prior Publication Data

US 2005/0091986 A1 May 5, 2005

Related U.S. Application Data

(63) Continuation of application No. 10/153,072, filed on May 21, 2002, now Pat. No. 6,779,333.

(51) Int. Cl.[7] ................................................ F02C 7/22
(52) U.S. Cl. ........................................... 60/775; 60/776
(58) Field of Search ................................ 60/776, 39.53, 60/39.465, 775; 431/11

(56) References Cited

U.S. PATENT DOCUMENTS

| | | | | |
|---|---|---|---|---|
| 3,850,569 A | * | 11/1974 | Alquist | 431/4 |
| 4,289,475 A | * | 9/1981 | Wall et al. | 431/11 |
| 6,010,544 A | | 1/2000 | Haldeman et al. | |
| 6,343,462 B1 | | 2/2002 | Drnevich et al. | |
| 6,434,945 B1 | * | 8/2002 | Mandai et al. | 60/740 |

OTHER PUBLICATIONS

Detroit Diesel Corporation, *Natural Gas–Fuelded Engines* at http://www.detroitdiesel.com/public/prod/pnetgas.asp, on Mar. 7, 2002, pp. 1–4.

* cited by examiner

*Primary Examiner*—Ehud Gartenberg
(74) *Attorney, Agent, or Firm*—Hovey Williams LLP

(57) ABSTRACT

A dual fuel power generation system employing a steam-mixed fuel and/or a gaseous fuel to power a turbine engine. The steam-mixed fuel is a gaseous mixture of a light hydrocarbon and steam. The steam-mixed fuel and gaseous fuel are delivered to the turbine engine (either individually or mixed) via a common fuel controller, a common fuel distribution system, and a common gas-only fuel nozzle.

26 Claims, 2 Drawing Sheets

DUAL FUEL POWER GENERATION SYSTEM

RELATED APPLICATIONS

Figure 1:
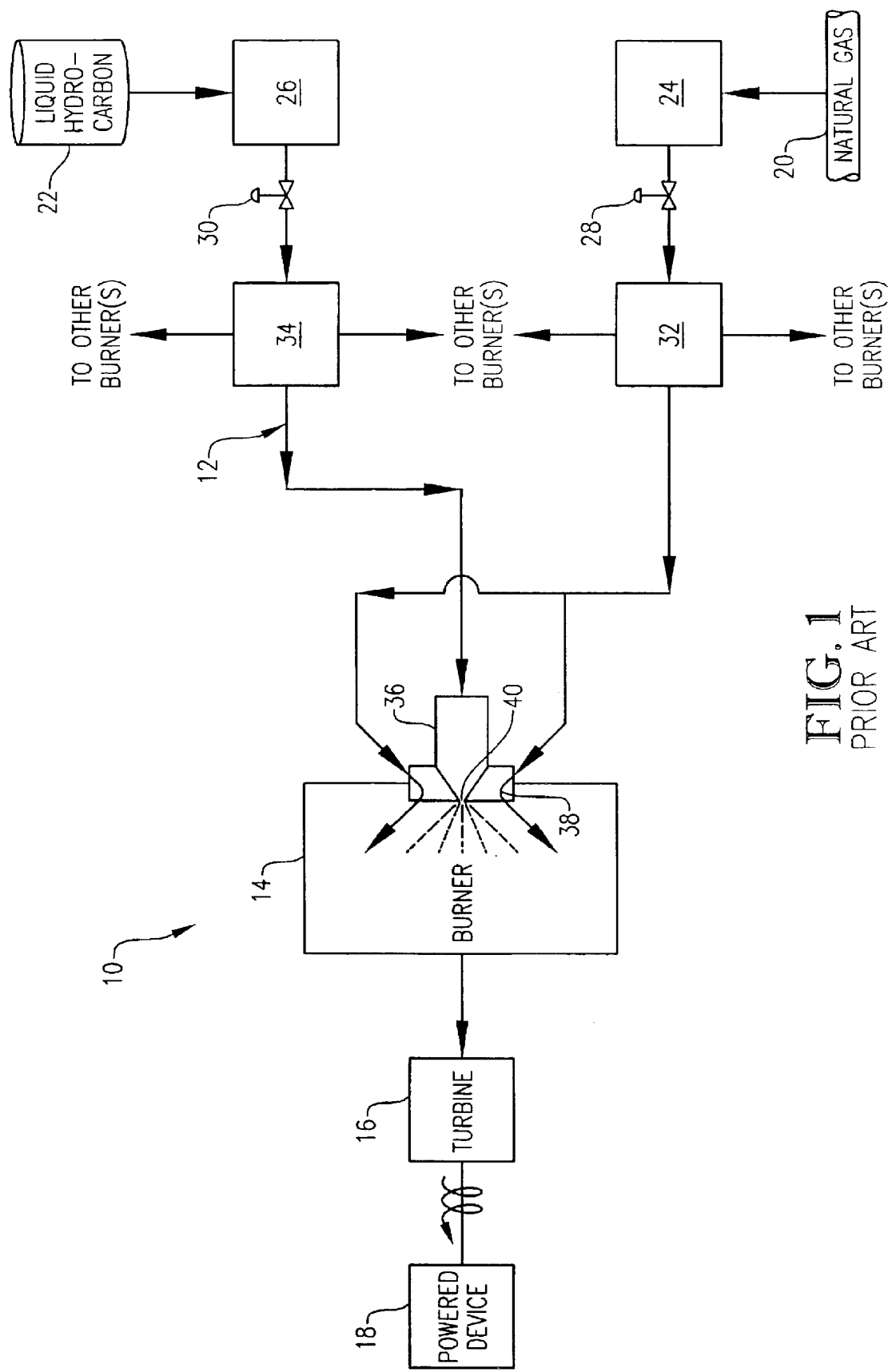

This is a continuation of application Ser. No. 10/153,072, filed May 21, 2002 now U.S. Pat. No. 6,779,333, the entire disclosure of which is hereby incorporated by reference.

BACKGROUND OF THE INVENTION

1. Field of the Invention

The present invention relates generally to dual fuel power generation systems employing one or more turbine engines. In another aspect, the invention concerns a dual fuel turbine system which can be powered by combusting natural gas and/or a gaseous fuel mixture of a light hydrocarbon and steam in the burner(s) of the turbine.

2. Description of the Prior Art

Coal-fired electrical power generation plants typically have an operating efficiency of about 30 to about 40 percent. In contrast, combined cycle electrical power plants, employing gas turbine engines and heat recovery, typically have an operating efficiency of about 40 to about 60 percent. Combined cycle power plants are also much less expensive to design and build than coal-fired plants. Because of these and other advantages, combined cycle power plants have been employed worldwide to provide electrical power for commercial and residential use. Similarly, the gas turbine or combined cycle plants can drive mechanical components like compressors.

To enhance the reliability of power generation, electrical utilities typically require combined cycle power plants to employ dual fuel systems for powering the turbine engine (s). Such dual fuel systems typically employ a gaseous fuel (e.g., natural gas) and a liquid fuel (e.g., distillate oils). The gaseous fuel is used to power the turbine under normal operating conditions, while the liquid fuel can be stored on site and used to power the turbine when the gaseous fuel is temporarily unavailable or when demand and/or price for the gaseous fuel is high. For example, when the weather turns cold the demand for natural gas as heating fuel and as fuel for electricity generation is very high. In such a situation, the liquid fuel can be used to power the turbine engine and generate electricity in a more reliable and/or cost-effective manner.

The dual fuel capability of combined cycle power plants requires additional construction, operation, and maintenance expenditures versus single fuel combined cycle power plants. For example, in dual fuel combined cycle power plants, both the gaseous fuel and the liquid fuel must have their own individual fuel control, distribution, and injection systems because the vastly different flow and combustion properties of the gaseous and liquid fuel make it virtually impossible to effectively control, distribute, and inject the fuels with the same fuel delivery system. Further, after the liquid fuel has been used to power the turbine engine, the liquid fuel delivery system must be thoroughly cleaned to prevent carbonaceous "gum," or worse yet solid deposits, from building up in the liquid fuel delivery system.

OBJECTS AND SUMMARY OF THE INVENTION

It is an object of the present invention to provide a dual fuel power generation system which allows both a liquid fuel and a gaseous fuel to be delivered to a turbine engine via a common fuel delivery system.

It is a further object of the present invention to provide a dual fuel (i.e., liquid fuel and gaseous fuel) power generation system that transforms the liquid fuel into a gaseous fuel mixture having flow and combustion properties similar to those of the gaseous fuel.

It is still a further object of the present invention to provide a dual fuel turbine power generation system which allows the source of fuel powering the turbine to be readily switched back and forth between a liquid fuel source and a gaseous fuel source with minimal operational and maintenance expense.

It is yet a further object of the present invention to provide a dual fuel turbine power generation system which allows a gaseous fuel and a liquid fuel powering the turbine to be readily mixed in various proportions to provide a more cost-effective power generation system.

It should be understood that the above-listed objects are only exemplary, and not all the objects listed above need be accomplished by the invention described and claimed herein. Further objects and advantages of the present invention will be apparent from the detailed description of the preferred embodiments, drawing figures, and appended claims.

Accordingly, in one embodiment of the present invention there is provided a power generation process comprising the steps of: (a) operating a turbine in a first mode wherein the turbine is powered by combusting a first gaseous fuel in a burner; and (b) operating the turbine in a second mode wherein the turbine is powered by combusting a second gaseous fuel in the burner, and the second gaseous fuel comprises a light hydrocarbon and steam.

In accordance with another embodiment of the present invention, there is provided a process for generating power using a gas turbine. The process generally comprises the steps of: (a) combusting natural gas in a burner of the gas turbine; and (b) combusting a steam-mixed fuel in the burner of the gas turbine, wherein the steam-mixed fuel consists essentially of a light hydrocarbon and steam.

In accordance with a further embodiment of the present invention, there is provided a dual fuel power generation system comprising a gaseous fuel source, a liquid fuel source, a steam source, a fuel mixing device, a turbine engine, and a fuel controller. The gaseous fuel source, liquid fuel source, and steam source are operable to provide gaseous fuel, liquid fuel, and steam, respectively. The fuel mixing device is fluidly coupled to the liquid fuel source and the steam source and is operable to mix the liquid fuel and the steam, thereby providing a steam-mixed fuel. The turbine engine is capable of being powered by combusting the gaseous fuel and the steam-mixed fuel, either individually or mixed. The fuel controller is fluidly coupled to the gaseous fuel source, the fuel mixing device, and the turbine engine and is operable to control the amount of the gaseous fuel and the amount of the steam-mixed fuel charged to the turbine engine.

In accordance with a still further embodiment of the present invention, there is provided a gaseous fuel composition comprising a gaseous mixture of a light hydrocarbon and steam. The gaseous mixture is above the dew point temperature and below the critical point of the mixture.

BRIEF DESCRIPTION OF THE DRAWING FIGURES

Figure 2:
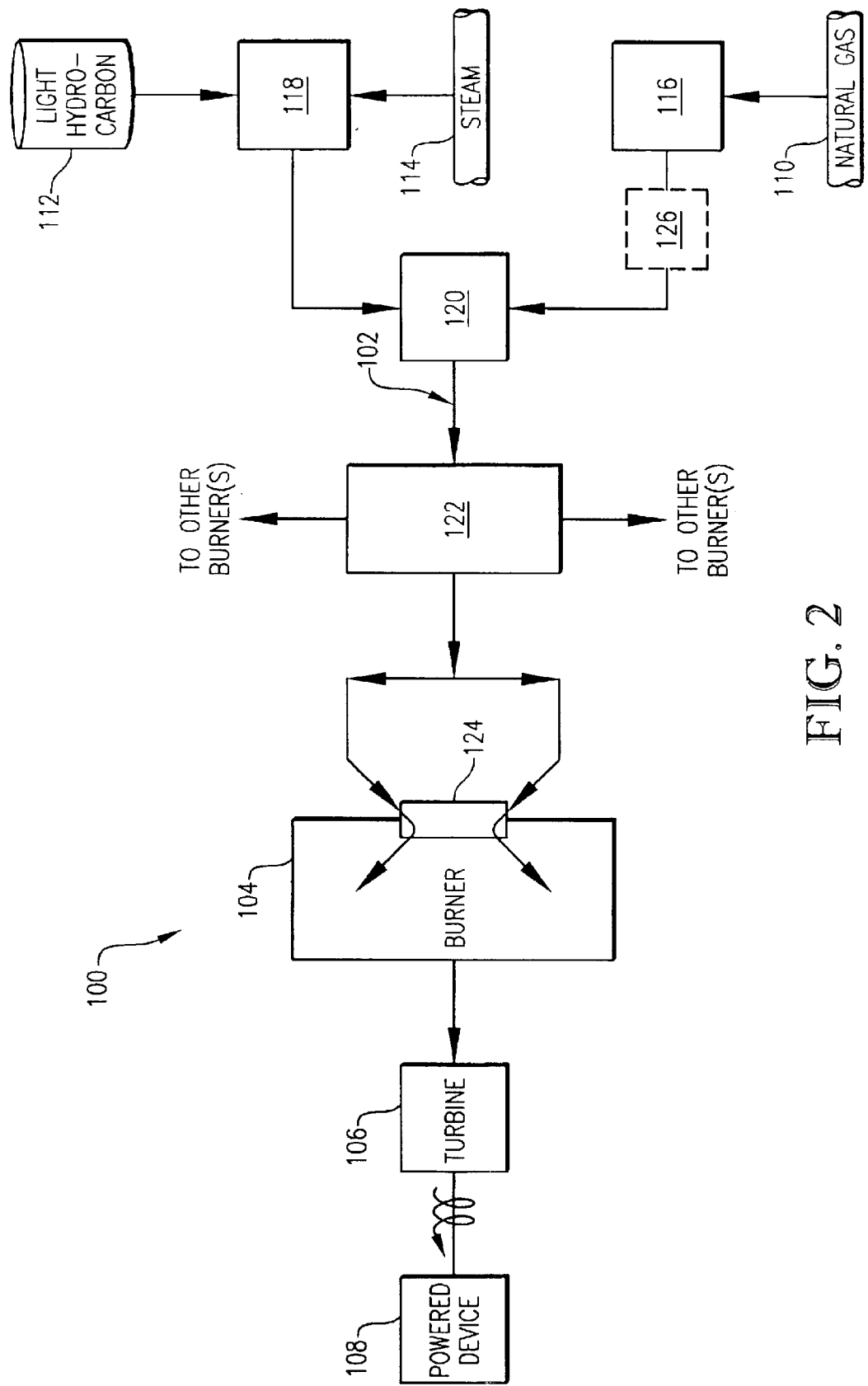

A preferred embodiment of the present invention is described in detail below with reference to the attached drawing figures, wherein:

FIG. 1 is a schematic diagram of a conventional power generation system, particularly illustrating a conventional separate dual fuel delivery system for a turbine engine; and FIG. 2 is a schematic diagram of an inventive power generation system, particularly illustrating a combined dual fuel delivery system for a turbine engine.

DETAILED DESCRIPTION OF THE PREFERRED EMBODIMENT

Referring initially to FIG. 1, a conventional power generation system 10 is illustrated as generally comprising a separate dual fuel delivery system 12, a burner 14, a turbine engine 16, and a powered device 18. Fuel delivery system 12 provides either a gaseous fuel or a liquid fuel to burner 14. In burner 14, the gaseous or liquid fuel is mixed with air and combusted. The combustion of the fuel in burner 14 powers turbine engine 16 which, in turn, mechanically powers powered device 18. Turbine engine 16 is typically a gas turbine employing in the range of from 5 to 20 individual burners 14. Most commonly, turbine engine 16 employs about 10 individual burners 14. Powered device 18 can be any device capable of converting mechanical energy into a more useful form such as, for example, electricity or pressurized fluid. Preferably, powered device 18 is an electrical generator or a fluid compressor. Fuel delivery system 12 generally comprises a gaseous fuel source 20, a liquid fuel source 22, a gas metering device 24, a liquid metering device 26, a gas fuel controller 28, a liquid fuel controller 30, a gas distribution system 32, a liquid distribution system 34, and a dual fuel nozzle 36. Fuel delivery system 12 is operable to deliver either a gaseous fuel from gaseous fuel source 20 or a liquid fuel from liquid fuel source 22 to burners 14 of turbine engine 16.

Gaseous fuel source 20 is typically a natural gas pipeline, while liquid fuel source 22 is typically a storage tank(s) for holding liquid hydrocarbon fuels such as, for example, distillate oils. During normal operation, natural gas is conducted from gaseous fuel source 20 to gas metering device 24 where the flow of the natural gas is metered. The natural gas is then conducted to gas fuel controller 28 where the flow rate of the natural gas is regulated. The natural gas is then conducted to gas distribution system 32 where the natural gas is divided into substantially equal streams. Each of the natural gas streams resulting from gas distribution system 32 is then conducted to an individual dual fuel nozzle 36 which is operable to inject the gas stream into a respective one of burners 14. Dual fuel nozzle 36 injects the gaseous fuel into burner 14 via gas injection ports 38 or the liquid fuel into burner 14 via a liquid fuel port 40.

During periods when it is impractical or impossible to use total natural gas as fuel for powering turbine engine 16, the liquid fuel from liquid fuel source 22 can be employed to power turbine engine 16 or simply supplement the natural gas fuel. The liquid fuel is delivered to burner 14 using a fuel delivery system which is similar to that used for the gaseous fuel. However, the same fuel delivery system cannot be used for both fuels due to the vastly different flow and combustion properties of the liquid and gaseous fuels. Thus, a separate liquid metering device 26, liquid fuel controller 30, liquid distribution system 34, and liquid fuel port 40 must be employed to deliver the liquid fuel to burner 14. Such duplication of fuel delivery components adds greatly to the overall construction, operation, and maintenance costs of fuel delivery system 12.

Referring now to FIG. 2, a power generation system 100, constructed in accordance with one embodiment of the present invention, is illustrated as generally comprising a combined dual fuel delivery system 102, a burner 104, a turbine engine 106, and a powered device 108. Fuel delivery system 102 provides a gaseous fuel and a liquid fuel (either individually or mixed) to burner 104. In burner 104, the gaseous or liquid fuel is mixed with air and combusted. The combustion of the fuel in burner 104 powers turbine engine 106 which, in turn, powers powered device 108. Burner(s) 104, turbine engine 106, and powered device 108 can be of the same type as described above with reference to FIG. 1. Fuel delivery system 102, generally comprises a gaseous fuel source 110, a liquid fuel source 112, a steam source 114, a gas metering device 116, a liquid fuel metering/blending device 118, a common fuel controller 120, a common fuel distribution system 122, and a gas-only fuel nozzle 124. Fuel delivery system 102 is operable to allow turbine engine 106 to be powered by the fuel(s) from either gaseous fuel source 110, liquid fuel source 112, or a mixture of both fuels, via combustion of the fuel(s) in burner 104. Fuel distribution system 102 eliminates the need for separate fuel controllers, separate fuel distribution systems, and dual fuel nozzles required by conventional fuel delivery systems for dual fuel power generation systems.

Fuel delivery system 102 can be operated in three modes: (1) a first mode where turbine engine 106 is powered solely by fuel from gaseous fuel source 110; (2) a second mode where turbine engine 106 is powered solely by a fuel mixture from liquid fuel source 112 and steam source 114; and (3) a third mode wherein turbine engine 106 is powered by a mixture of fuels from gaseous fuel source 110, liquid fuel source 112, and steam source 114. The mode of operation of fuel distribution system 102 is primarily controlled by common fuels controller 120 which is operable to switch between fuel sources, mix fuels from the fuel sources in appropriate proportions, and control the flow rate of the individual or mixed fuels to common fuel distribution system 122.

When operating in the first mode (i.e., gaseous fuel only), the gaseous fuel is conducted from gaseous fuel source 110 to gas metering device 116. Gas fuel source 110 is preferably a natural gas pipeline. Gas metering device 116 is operable to meter the flow of the gaseous fuel prior to introduction of the gaseous fuel into common fuel controller 120. Common fuel controller 120 is operable to control the flow rate of the gaseous fuel to common fuel distribution system 122. Common fuel distribution system 122 is operable to substantially evenly divide the gaseous fuel stream into a plurality of individual gaseous fuel streams. Each individual gaseous fuel stream is then charged to a respective fuel nozzle 124. Gas-only fuel nozzle 124 injects the gaseous fuel into burner 104 for mixture with air and combustion therein.

The gaseous fuel provided by gaseous fuel source 110 can be any normally gaseous (i.e., exists in a vapor state at STP) hydrocarbon-containing fuel such as, for example, natural gas. As used herein, the term "natural gas" shall denote a normally gaseous hydrocarbon-containing fluid comprising at least about 90 mole percent hydrocarbons, with at least about 70 mole percent of those hydrocarbons being methane. Preferably, the gaseous fuel provided by gaseous fuel source 110 is a normally gaseous hydrocarbon-containing fluid comprising the components and ranges of such components set forth in Table 1, below.

TABLE 1

Composition of Gaseous Fuel from Gaseous Fuel Source 110

| Range | Total Hydrocarbons (mole %) | Methane ($C_1$) (mole %) | $C_2$–$C_4$ (mole %) |
|---|---|---|---|
| Preferred | >60 | 50–100 | 0–20 |
| More Preferred | >80 | 85–90 | 1–15 |
| Most Preferred | >95 | 88–96 | 2–8 |

When operating in the second mode (i.e., liquid/steam fuel mixture only), the liquid fuel from liquid fuel source 112 is conducted to metering/blending device 118 for metering and blending with steam from steam source 114. The liquid fuel from liquid fuel source 112 is preferably a light hydrocarbon fluid. As used herein, the term "light hydrocarbon" shall denote a fluid comprising at least about 70 mole percent $C_1$–$C_7$ hydrocarbons. The light hydrocarbon fluid preferably comprises at least about 80 mole percent hydrocarbons, more preferably at least about 90 mole percent hydrocarbons, and most preferably at least 95 mole percent hydrocarbons. The hydrocarbons of the light hydrocarbon fluid are preferably $C_2$–$C_7$ hydrocarbons, more preferably $C_3$–$C_6$ hydrocarbons, still more preferably $C_4$–$C_5$ hydrocarbons, and most preferably the hydrocarbons of the light hydrocarbon fluid comprise or consist essentially of hydrocarbons selected from the group consisting of n-butane, n-propane, and mixtures thereof. The normal boiling point of the light hydrocarbon fluid is preferably in the range of from about −200 to about 200° F., more preferably in the range of from −100 to 150° F.

The light hydrocarbon fluid is stored in liquid fuel source 112 in a liquid state (pressurized if necessary). The temperature and pressure of the steam-mixed fuel formed from the light hydrocarbon and the steam in metering/blending device 118 is preferably sufficient to vaporize the light hydrocarbon and thereby form a substantially homogenous gaseous fuel mixture of the light hydrocarbon and steam. Such steam-mixed fuel preferably comprises the light hydrocarbon in an amount in the range of from about 5 to about 90 mole percent, more preferably in the range of from about 10 to about 70 mole percent, still more preferably in the range of from about 20 to about 50 mole percent, and most preferably in the range of from 30 to 45 mole percent. The steam-mixed fuel preferably comprises steam in an amount in the range of from about 10 to about 95 mole percent, more preferably in the range of from about 30 to about 90 mole percent, still more preferably in the range of from about 50 to about 80 mole percent, and most preferably in the range of from 55 to 70 mole percent.

The steam-mixed fuel exiting metering/blending device 118 preferably has similar properties to the gaseous fuel exiting gas metering device 116. These properties allow the steam-mixed fuel from metering/blending device 118 and the gaseous fuel from gas metering device 116 to be delivered to burner 120 via the same fuel controller 120, fuel distribution system 122, and nozzle 124, thereby reducing the overall expense of fuel distribution system 102 and allowing fuel distribution system 102 to be readily switched between the first and second modes with minimal maintenance and expense. Further, the similar properties of the steam-mixed fuel and the gaseous fuel allow the fuels to be readily mixed in fuel controller 120 in a variety of proportions without significantly affecting the operation of burner 104, turbine engine 106, and powered device 108.

It is important for the Modified Wobbe Index value of the steam-mixed fuel entering common fuel controller 120 to be similar to that of the gaseous fuel entering common fuel controller 120 in order to allow for consistent fuel delivery through a common system and consistent power generation by turbine engine 106 regardless of the mode of operation of fuel delivery system 102. The Modified Wobbe Index (MWI) is a measure of fuel energy flow rate through a fixed orifice under given inlet conditions and can be expressed as follows:

$$MWI = \frac{LHV}{\sqrt{SG \cdot T_a}}(BTU/SCF \cdot {}^\circ R^{0.5})$$

wherein LHV is the lower heating valve (BTU/SCF) of the fuel at inlet conditions, SG is the specific gravity at the fuel relative to air at ISO (1 atm, 70° F.) conditions, and $T_a$ is absolute temperature (° R). The LHV of a fuel is the maximum energy released in a combustion process when all the water in the combustion products is in the vapor state. The LHV of a fuel is highly dependent upon the density of the fuel and is, therefore, highly dependent upon the temperature and pressure of the fuel. Thus, the MWI of a fuel is also dependent upon the temperature and pressure of the fuel.

The inlet temperature of the fuel(s) entering common fuel controller 120 is preferably in the range of from about 200° to about 600° F., more preferably in the range of from about 300° to about 450° F., still more preferably in the range of from 325° to 400° F., and most preferably about 365° F. The inlet pressure of the fuel(s) entering common fuel controller 120 is preferably in the range of from about 200 to about 600 psig, more preferably in the range of from about 300 to about 500 psig, still more preferably in the range of from 350 to 450 psig, and most preferably about 400 psig.

It is preferred for the gaseous fuel from gaseous fuel source 110 to have a MWI in the range of from about 25 to about 75 BTU/SCF•° $R^{0.5}$ at the inlet conditions of common fuel controller 120. More preferably, the MWI of the gaseous fuel at the inlet of common fuel controller 120 is in the range of from about 40 to about 60 BTU/SCF•° $R^{0.5}$, and most preferably in the range of from 45 to 55 BTU/SCF•° $R^{0.5}$. The MWI of the steam-mixed fuel from metering/blending device 118 is preferably within about 20 percent of the MWI of the gaseous fuel from gaseous fuel source 110 at the same operating conditions throughout fuel controller 120, fuel distribution system 122, and nozzle 124. More preferably, the MWI of the steam-mixed fuel is within about 10 percent of the MWI of the gaseous fuel throughout the common fuel delivery system, still more preferably within about 5 percent, and most preferably within 2 percent.

It is also important for the adiabatic flame temperatures of the steam-mixed fuel from mixing/blending device 118 and the gaseous fuel from gaseous fuel source 110 to be similar under the operating conditions of burner 104. Adiabatic flame temperature depends primarily on the composition of the fuel, the fuel :air ratio, the initial air temperature, and the pressure. Whether operating in the first mode (gaseous fuel only), second mode (steam-mixed fuel), or third mode (mixture of gaseous fuel and steam-mixed fuel), it is preferred for the fuel:air ratio, the initial air temperature, and the pressure of burner 104 to remain substantially constant. As used herein, the adiabatic flame temperature of a fuel shall refer to the calculated adiabatic flame temperature based solely on the air flow to the primary zone (i.e., where substantially all of the burning occurs) of burner 104, disregarding any dilution air added downstream of the primary zone.

In order to provide adequate energy to turbine 106 without producing high levels of $NO_x$ it is preferred for the stoichiometric adiabatic flame temperature of the gaseous fuel from gaseous fuel source 110 to be in the range of from about 3000° to about 4250° F. at the operating conditions of burner 104, more preferably the stoichiometric adiabatic flame temperature of the gaseous fuel at burner 104 operating conditions is in the range of from about 3500° to about 4100° F., still more preferably in the range of from 3800° to 4000° F., and most preferably about 3950° F. The actual burning temperature in the flame zone depends on the local fuel/air mixture and will be less than the stoichiometric valves quoted. The adiabatic flame temperature of the steam-mixed fuel at burner 104 operating conditions is preferably within about 20 percent of the adiabatic flame temperature of the gaseous fuel under the same conditions, more preferably within about 10 percent, still more preferably within about 5 percent, and most preferably within 2 percent. The adiabatic flame temperature of the steam-mixed fuel at burner 104 operating conditions is preferably within about 500° F. of the adiabatic flame temperature of the gaseous fuel under the same conditions, more preferably within about 200° F., still more preferably within about 100° F., and most preferably within 50° F.

The temperature and pressure of the steam-mixed fuel can vary between the outlet of metering/blending device 118 and the outlet of nozzle 124. However, it is preferred for the temperature of the steam-mixed fuel at all points between the outlet of metering/blending device 118 and the outlet of nozzle 124 to be maintained above its water dew point temperature in order to avoid water condensation in fuel delivery system 102. More preferably, the temperature of the steam-mixed fuel between the outlet of metering/blending device 118 and the outlet of nozzle 124 is maintained at least 25° F. above its dew point temperature, and most preferably at least 50° F. above its dew point temperature. However, it is preferred for the steam-mixed fuel to be maintained below its critical point, having a temperature that is below its critical temperature and/or a pressure that is below its critical pressure.

Referring again to FIG. 2, fuel delivery system 102 can include an optional gas fuel heater 126 fluidly disposed between gaseous common fuel source 110 and fuel controller 120. If the gaseous fuel from gaseous fuel source 110 has a temperature that is significantly less than the steam-mixed fuel from metering/blending device 118, it may be necessary to heat the gaseous fuel just prior to, and/or during, switching from the first mode (gaseous fuel only) to the second mode (steam-mixed fuel only). This heating of the gaseous fuel source warms the metering/blending device 120 and other downstream components of fuel delivery system 102 prior to injecting the steam-mixed fuel therein. Such warming of these components ensures that the temperature of the steam-mixed fuel does not fall below its dew point temperature.

The present invention can be employed in a variety of different applications that use turbines to generate either mechanical or electrical power. For example, the invention disclosed herein can provide significant advantages when employed in a plant used for liquefying natural gas (i.e., an LNG plant). Most LNG plants employ one or more turbines to power fluid compressors. The "fuel gas" used to power these turbines is typically obtained from the flash gas stream from the first step of depressurizing the LNG from about 600 psi to about ambient. This gas-phase fuel gas used to power the turbine(s) comprises predominately natural gas and may include up to 15 mole percent nitrogen. Typically, the fuel gas will comprise at least 75 mole percent methane and less than 10 mole percent nitrogen. Most typically, the fuel gas will comprise 80 to 95 mole percent methane and 0.5 to 5 mole percent nitrogen.

During the cooling of a natural gas stream to liquefaction temperatures in an LNG plant, "natural gas liquids" will generally drop out. Such natural gas liquids typically comprise light hydrocarbons such as, for example, ethane, propane, and butane. Conventionally, natural gas liquids generated in an LNG plant have either been fractionated into various products (which can be an expensive process) or simply burned in boilers of the LNG plant to provide heat (an inefficient use of the natural gas liquids). In accordance with one embodiment of the present invention, the natural gas liquids produced by the LNG plant can be mixed with steam to provide a gaseous steam-mixed fuel that can be used to power the turbine(s) normally powered by the fuel gas. The steam-mixed fuel can be used by itself to power the turbine(s) or, alternatively, the steam-mixed fuel and the fuel gas can be mixed in various proportions to cooperatively power the turbine(s). The composition and combustion properties of the steam-mixed fuel and the fuel gas obtained from the LNG plant will generally fit the description of the steam-mixed fuel and the gaseous fuel disclosed in the first embodiment of the present invention. These properties allow the fuel source for the turbine to be readily switched between the fuel gas and the steam-mixed fuel.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventor hereby states his intent to rely on the doctrine of equivalents to determine and assess the reasonably fair scope of the present invention as pertains to any apparatus not materially departing from but outside the literal scope of the invention as set forth in the following claims.

What is claimed is:

1. A power generation process comprising the steps of:
   (a) operating a turbine in a first mode wherein the turbine is powered by combusting a first gaseous fuel comprising at least about 50 mole percent methane in plurality of burners; and
   (b) operating the turbine in a second mode wherein the turbine is powered by combusting a second gaseous fuel in the burners,
   said second gaseous fuel comprising about 5 to about 90 mole percent of a light hydrocarbon and about 10 to about 95 mole percent steam,
   said light hydrocarbon comprising at least about 80 mole percent $C_2$–$C_7$ hydrocarbons,
   said first and second gaseous fuels being supplied to the burners via common fuel lines.

2. The power generation process according to claim 1, said first gaseous fuel being natural gas,
   said light hydrocarbon comprising at least about 90 mole percent $C_3$–$C_6$ hydrocarbons,
   said second gaseous fuel comprising about 10 to about 70 mole percent of the light hydrocarbon and about 30 to about 90 mole percent steam.

3. The power generation process according to claim 1, said second gaseous fuel having a Modified Wobbe Index within about 20 percent of the first gaseous fuel at inlet conditions of the burners, said second gaseous fuel having an adiabatic flame temperature within about 20 percent of the first gaseous fuel at operating conditions of the burners.

4. The power generation process according to claim 1, step (b) including mixing the light hydrocarbon and steam in a fuel mixing device to thereby form the second gaseous fuel and conducting the second gaseous fuel from the fuel mixing device to the burners.

5. The power generation process according to claim 4, step (b) including maintaining the second gaseous fuel above the dew point temperature of the second gaseous fuel between the fuel mixing device and the burners.

6. The power generation process according to claim 5, step (b) including maintaining the second gaseous fuel below the critical point of the second gaseous fuel between the fuel mixing device and the burners.

7. The power generation process according to claim 1; and
(c) switching between the first and second modes.

8. The power generation process according to claim 1; and
(d) operating the gas turbine in a third mode wherein the turbine is powered by combusting a mixture of the first gaseous fuel and the second gaseous fuel in the burners.

9. The power generation process according to claim 1, said first gaseous fuel being fuel gas obtained from an LNG plant,
said second gaseous fuel comprising a mixture of natural gas liquids from an LNG plant and steam.

10. A process for generating power using a gas turbine, said process comprising the steps of:
(a) combusting natural gas in a burner of the gas turbine; and
(b) combusting a steam-mixed fuel in the burner of the gas turbine, either of the natural gas and the steam mixed fuel being supplied to said burner via a common fuel line,
said steam-mixed fuel consisting essentially of a light hydrocarbon and steam,
said steam-mixed fuel comprising about 10 to about 70 mole percent of the light hydrocarbon and about 30 to about 90 mole percent steam,
said light hydrocarbon comprising at least about 90 mole percent $C_2$–$C_7$ hydrocarbons,
said steam-mixed fuel having a Modified Wobbe Index within about 20 percent of the natural gas at inlet conditions of the burner,
said steam-mixed fuel having an adiabatic flame temperature within about 20 percent of the natural gas at operating conditions of the burner.

11. The process according to claim 10, said light hydrocarbon consisting essentially of a hydrocarbon selected from the group consisting of n-butane, n-pentane, and mixtures thereof.

12. The process according to claim 10; and
(c) switching between steps (a) and (b).

13. The process according to claim 10, steps (a) and (b) being mutually exclusive.

14. The process according to claim 10; and
(d) performing steps (a) and (b) simultaneously by combusting a mixture of the natural gas and the steam-mixed fuel in the burner.

15. In a process for liquefying natural gas, the improvement comprises the steps of:
(a) combusting a gaseous steam-mixed fuel in a burner of a gas turbine used to power a fluid compressor, said steam-mixed fuel comprising about 5 to about 90 mole percent natural gas liquids and about 10 to about 95 mole percent steam, said natural gas liquids comprising at least about 80 mole percent $C_2$–$C_7$ hydrocarbons; and
(b) combusting a gaseous fuel gas in the burner of the gas turbine, said fuel gas comprising at least 75 mole percent natural gas, either of the gaseous steam-mixed fuel and the gaseous fuel gas being supplied to said burner via a common fuel line.

16. The process according to claim 15,
said steam-mixed fuel having a Modified Wobbe Index within about 20 percent of the fuel gas at inlet conditions of the burner,
said steam-mixed fuel having an adiabatic flame temperature within about 20 percent of the fuel gas at operating conditions of the burner.

17. The process according to claim 15,
steps (a) and (b) being mutually exclusive.

18. The process according to claim 15; and
(c) combusting a mixture of the steam-mixed fuel and the fuel gas in the burner.

19. The power generation process according to claim 1; and
(e) controlling the rate of flow of the first and second gaseous fuels to the burners via a common fuel controller.

20. The power generation process according to claim 1,
said light hydrocarbon consisting essentially of ethane, propane, and/or butane.

21. The process according to claim 10; and
(e) controlling the rate of flow of the natural gas and the steam-mixed fuel to the burner via a common fuel controller.

22. The process according to claim 10,
said natural gas and said steam-mixed fuel being supplied to the burner via a common fuel distribution system,
said natural gas and said steam-mixed fuel being introduced into the burner via a common single fuel nozzle.

23. The process according to claim 10,
said light hydrocarbon consisting essentially of ethane, propane, and/or butane.

24. The process according to claim 15; and
(d) controlling the rate of flow of the gaseous steam-mixed fuel and the gaseous fuel gas to the burner via a common fuel controller.

25. The process according to claim 15,
said gaseous steam-mixed fuel and said gaseous fuel gas being supplied to the burner via a common distribution system,
said gaseous steam-mixed fuel and said gaseous fuel gas being introduced into the burner via a common single fuel nozzle.

26. The process according to claim 15,
said natural gas liquids consisting essentially of ethane, propane, and/or butane.

* * * * *